United States Patent Office 3,227,731
Patented Jan. 4, 1966

3,227,731
1-(α-TETRAHYDROFURYL)-2,2-DIALKYL - 1,3 - DI-HYDROXYPROPANES, AND CARBAMATES AND CARBONATES OF 1-(α-FURYL)-2,2-DIALKYL-1,3-DIHYDROXYPROPANES AND 1-(α - TETRAHYDROFURYL) - 2,2 - DIALKYL - 1,3 - DIHYDROXYPROPANES
Kurt Kulka, New York, N.Y., assignor to Fritzsche Brothers, Inc., New York, N.Y., a corporation of New York
No Drawing. Filed Nov. 14, 1963, Ser. No. 323,576
16 Claims. (Cl. 260—340.7)

This application is a continuation-in-part of the copending application of Kurt Kulka, Ser. No. 284,805, filed June 3, 1963, now abandoned.

This invention relates to new compositions of matter and more particularly to 1-(α-furyl)-2,2-dialkyl-1,3-dihydroxypropanes; the mono and di lower alkyl and the mono and di phenyl carbonates and the mono and di lower alkyl and mono and di phenyl carbamates thereof; 1 - (α-tetrahydrofuryl)-2,2-dialkyl-1,3-dihydroxypropanes; and the mono and di lower alkyl and the mono and di phenyl and the cyclic carbonates, the mono and di carbamates and the mono and di lower alkyl and the mono and di phenyl carbamates of 1-(α-tetrahydrofuryl)-2,2-dialkyl-1,3-dihydroxypropanes.

The 1-(α-furyl)-2,2-dialkyl-1,3-dihydroxypropanes, the 1 - (α - tetrahydrofuryl-2,2-dialkyl-1,3-dihydroxypropanes and the mono and di carbamates of 1-(α-tetrahydrofuryl)-2,2-dialkyl-1,3-dihydroxypropanes manifest tranquilizing effects when administered to animals. The mono and di lower alkyl carbamates and the mono and di phenyl carbamates of both types of glycols have a sedative effect. The mono and di lower alkyl and the mono and di phenyl carbamates of 1-(α-furyl)-2,2-dialkyl-1,3-dihydroxypropanes and the mono and di lower alkyl, the mono and di phenyl and the cyclic carbonates of 1 - (α-tetrahydrofuryl)-2,2-dialkyl-1,3-dihydroxypropanes are useful in producing the corresponding carbamates, while the carbonates of both types of glycols are useful in perfume compounding.

The 1-(α-furyl)-2,2-dialkyl-1,3-dihydroxypropanes of this invention have the formula:

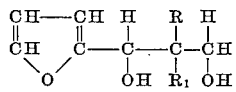

in which R is an alkyl group, $R_1$ is an alkyl group and the total number of carbon atoms in both alkyl groups is less than eight.

The 1 - (α-tetrahydrofuryl)-2,2-dialkyl-1,3-dihydroxypropanes of this invention have the formula:

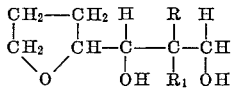

in which R is an alkyl group, $R_1$ is an alkyl group and the total number of carbon atoms in both alkyl groups is less than eight.

The 1-(α-furyl)-2,2-dialkyl-1,3-dihydroxypropanes are produced by reacting furfural in the presence of a methanolic solution of an alkali metal hydroxide with an aldehyde having the formula:

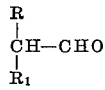

The desired glycol is recovered. The 1-(α-tetrahydrofuryl)-2,2-dialkyl-1,3-dihydroxypropanes are prepared by the hydrogenation of the required 1-(α-furyl)-2,2-dialkyl-1,3-dihydroxypropanes in the presence of metallic hydrogenation catalysts. The lower alkyl carbonates of the resulting 1 - (α-tetrahydrofuryl)-2,2-dialkyl-1,3-dihydroxypropanes are obtained by reacting a solution of the required glycol, desirably containing a tertiary amine, such as a trialkyl amine or pyridine, with an alkyl chloroformate in which the alkyl group preferably contains less than six carbon atoms. The carbamates of the 1-(α-tetrahydrofuryl)-2,2-dialkyl-1,3 - dihydroxypropanes are produced from a lower alkyl carbonate of the glycol by ammonia treatment desirably with agitation of a solution of the corresponding lower alkyl carbonate. The mono lower alkyl or phenyl carbamates of the 1-(α-tetrahydrofuryl)-2,2-dialkyl-1,3-dihydroxypropanes are obtained by reacting one mole of the desired lower alkyl or phenyl isocyanate with the glycol. If the corresponding di lower alkyl or diphenyl dicarbamate is desired, two moles of the lower alkyl or phenyl isocyanate are reacted.

The cyclic carbonates of 1-(α-tetrahydrofuryl)-2,2-dialkyl-1,3-dihydroxypropanes are produced by adding at 5–10° C. over a period of 1 to 2 hours approximately 1½ moles of phosgene to an agitated toluene solution of one mole of the required glycol. After the addition, the excess phosgene is removed by gradual heating to 40–50° C.

The mono lower alkyl or mono phenyl carbonates of 1-(α-furyl)-2,2-dialkyl-1,3 - dihydroxypropanes are produced by adding under agitation at 10–15° C. one mole of an alkyl chloroformate or 1 mole of phenyl chloroformate to a benzene or toluene solution of one mole of the corresponding required 1-α-furyl glycol. The benzene or toluene solution also contains one mole of a tertiary amine base, such as pyridine or triethylamine. After the addition, agitation is continued at room temperature overnight. The solution is then washed with warm water to remove the tertiary amine hydrochloride, leaving the mono lower alkyl or mono phenyl carbonate in solution. If desired, the solvent may be removed by distillation. If di lower alkyl or di phenyl carbonates of 1-(α-furyl)-2,2-dialkyl-1,3-dihydroxypropanes are desired, approximately 20% in excess over two moles of the required chloroformate and of the tertiary amine base are employed for each mole of the unsaturated glycol.

The mono lower alkyl carbamates of 1-(α-furyl)-2,2-dialkyl-1,3-dihydroxypropanes and the mono phenyl carbamates of these glycols are prepared by adding 1 mole of a lower alkyl isocyanate, such as methyl isocyanate, or 1 mole of phenyl isocyanate to a benzene solution containing 1 mole of the glycol and 1 to 2 cc. of pyridine which acts as a catalyst. The reaction starts slightly exothermic and is completed by refluxing the reaction mixture for 1 to 2 hours. The di lower alkyl carbamates of these glycols as well as the di phenyl carbamates of these glycols are prepared in the same manner by reacting 2 moles of the corresponding isocyanate with 1 mole of the glycol.

The glycols and carbamates of this invention which manifest a tranquilizing effect and/or sedative effect may be administered in dosage form. For this purpose, the compound may be mixed with a pharmaceutical carrier. For example, 40 g. may be dissolved in 1 kg. of a glyceridic oil such as peanut oil, and administered to an animal such as a domestic animal in a dosage of 0.4 g. per kilogram of body weight. Again, tablets of the compound may be prepared by granulating the desired amount of compound with starch and lactose and compressing them into tablets. Carriers, binders, lubricants and other components may be utilized in conventional manners with the compounds of this invention to produce dosage forms suitable for oral, parenteral or other form of administration.

A more comprehensive understanding of this invention is obtained by reference to the following examples:

EXAMPLE I

*Preparation of 1-(α-furyl)-2,2-dimethyl-1,3-dihydroxypropane*

To a solution of 180 g. of sodium hydroxide in 1,000 ml. of methanol was added over a period of 3 hours, under agitation, a mixture of 288 g. of freshly distilled furfural and 540 g. of isobutyraldehyde. During the addition, the temperature is kept between 48–52° C. After the addition, agitation was continued, for 3¼ hours whereby the reaction temperature decreased to 29° C. The reaction mixture was acidified with glacial acetic acid, 500 ml. of water were added and the reaction mixture was permitted to stand overnight. The next day 800 ml., consisting mostly of methanol, were distilled off from a steam bath, under agitation, using a 1½ ft. Vigreux column. The remaining organic part was diluted with 800 ml. of benzene and this solution was washed twice with 300 ml. portions of warm water. The solvent was distilled off in a slight vacuum from a steam bath. The residue crystallized to a yellow compound. It was fractionated through a 2 ft. Vigreux column, as follows:

| | Temperature, ° C. | | Vac., mm. | Ml. | Wt., g. |
|---|---|---|---|---|---|
| | Vapor | Flask | | | |
| Front Section | 99–118 | 128–132 | 4 | 60 | 56 |
| Main Section | 125–133 | 136–158 | 4 | 340 | 358 |
| Residue | | | | | 23 |
| Total | | | | | 437 |

The main section which crystallized had a melting point of 60–61° C. and a purity by a wet analysis (acetylation) of 99%. It was recrystallized from a benzene-hexane mixture, had a melting point of 61–62° C. and was represented by the following formula:

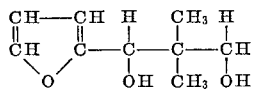

An I.R. curve indicated that the desired compound was obtained.

EXAMPLE II

*Preparation of 1-(α-tetrahydrofuryl)-2,2-dimethyl-1,3-dihydroxypropane*

Using 5 g. of Raney nickel catalyst, a solution containing 250 ml. of isopropanol and 255 g. of 1-(α-furyl)-2,2-dimethyl-1,3-dihydroxypropane, prepared as described in Example I, were hydrogenated at an initial pressure of 100 p.s.i. and a reaction temperature of 50° C. The theoretical amount of hydrogen was consumed in 7 hours. The reaction mixture was filtered off from the catalyst and the solvent was removed by distillation in a slight vacuum from a steam bath. The residue was examined by I.R. spectroscopy and the I.R. curve was found to be in correlation with that of the expected product.

The product was fractionated without a column, as follows:

| | R.I. 20° | Temperature, ° C. | | Vac., mm. | Ml. | Wt. |
|---|---|---|---|---|---|---|
| | | Vapor | Flask | | | |
| Front Section | 1.4750 | 124–126 | 129–130 | 4 | 5 | 4.6 |
| Main Section | 1.4785 | 126–136 | 130–140 | 4 | 222 | 235.5 |
| Residue | | | | | | 5.7 |
| Total | | | | | | 245.8 |

The wet analysis (acetylation) was 98.5%. I.R. spectrum indicated the correct structure.

EXAMPLE III

*Preparation of monomethyl carbonate of 1-(α-tetrahydrofuryl)-2,2-dimethyl-1,3-dihydroxypropane*

To a well agitated mixture of 44 g. of 1-(α-tetrahydrofuryl)-2,2-dimethyl-1,3-dihydroxypropane, 70 ml. of benzene and 24 g. of pyridine was added over a period of 30 minutes, a solution of 27 g. of methylchloroformate dissolved in 30 ml. of benzene. During the addition, the reaction mixture was cooled and maintained between 7 and 12° C. The reaction mixture was then agitated at 22–23° C. for one hour. It was then heated to 51–58° C. under agitation for a period of about 4½ hours thereafter. The reaction mixture stood overnight at room temperature. The following day, the reaction mixture was washed successively once with 150 ml. of water, twice with 100 ml. of a 2% aqueous hydrochloric acid solution, once with 100 ml. of an aqueous saturated sodium bicarbonate solution, and twice with 100 ml. of water. The solvent was then distilled off at a light vacuum on a steam bath. A viscous amber liquid remained consisting of 44 g. of crude reaction product. The actual yield was 75.2%. I.R. curves indicated the desired reaction product was obtained.

EXAMPLE IV

*Preparation of monocarbamate of 1-(α-tetrahydrofuryl)-2,2-dimethyl-1,3-dihydroxypropane*

A stream of ammonia gas was passed from a period of 17 hours through a solution containing 40 g. of ammonia water, 80 ml. of isopropanol and 40 g. of the mono methyl carbonate of 1 - (α - tetrahydrofuryl)-2,2-dimethyl-1,3-dihydroxypropane, prepared as described in Example II. During the introduction of the ammonia gas, the solution was agitated and maintained at room temperature. After the 17 hour period, the ammonia water and solvent were distilled off. A viscous yellow oil of 36.4 g. resulted. On standing, it partially crystallized. It was treated with 100 ml. of isopropanol and 3 g. of activated carbon under reflux and filtered hot. On standing crystals formed which were collected on a Buchner funnel. 15 g. of crystals representing a 40% yield of the theoretical were obtained. The melting point was 136–141° C. The nitrogen determination by Kjeldahl was 6.81% compared with a theoretical of 6.45%. A molecular weight determination by the Rast method was 219 as contrasted with a theoretical value of 217. An I.R. curve indicated that the desired compound was obtained.

EXAMPLE V

*Preparation of mono methyl carbamate of 1-(α-tetrahydrofuryl)-2,2-dimethyl-1,3-dihydroxypropane*

The moisture contained in a solution of 87 g. of 1-(α-tetrahydrofuryl) - 2,2 - dimethyl-1,3-dihydroxypropane in 200 ml. of benzene was first removed by refluxing with a water trap. The solution was then cooled to 22° C. and 32 g. of methyl isocyanate were added to one portion, followed by 0.5 ml. of pyridine as a catalyst. The temperature rose to 27° C. The reaction mixture was permitted to stand at room temperature for 22 hours and was then refluxed at 81° C. for 6¾ hours. The solvent was distilled off in a slight vacuum. To the 133 g. of crude product crystals remaining were added 150 ml. of hexane and 80 ml. of benzene. The mixture was heated to reflux and filtered. On cooling crystals formed, which were collected on a Buchner funnel and recrystallized from 60 ml. of isopropanol (carbon present). The mono methyl carbamate obtained weighed 41 g., representing 35.3% of the theoretical, and had a melting point of 130.8–132.3° C. The nitrogen determination (Kjeldahl) was 6.04% compared with a theoretical of 6.06%. The I.R. curve corresponded to the expected compound.

The mono phenyl carbamate of 1-(α-tetrahydrofuryl)-2,2-dimethyl - 1,3 - dihydroxypropane is produced in the same manner as the mono methyl carbamate in this example except that 60 g. of phenyl isocyanate is employed instead of the 32 g. of methyl isocyanate.

EXAMPLE VI

*Preparation of 1-(α-furyl)-2-methyl-2-ethyl-1,3-dihydroxypropane*

To a solution of 44 g. (1.1 mole) of sodium hydroxide in 660 ml. of methanol is added over a period of 6 hours, under agitation and while maintaining reaction temperature between 10–15° C., a solution of 96 g. (1 mole) of freshly distilled furfural, 176 g. (2.05 moles) of methyl-ethyl-acetaldehyde and 50 ml. methanol. Agitation is continued overnight at room temperature (approximately 16 hours). The next day the reaction mixture is neutralized with acetic acid. 300 ml. of water are added and approximately 700 ml. of methanol are distilled off under agitation. The residue is taken up in 200 ml. of benzene, washed successively with 100 ml. of warm water, twice with 100 ml. of an aqueous sodium bicarbonate solution and with 100 ml. portions of water until neutral to litmus. The solvent is distilled from a steam bath under vacuum. Any unreacted materials are removed by distillation in vacuum. The desired glycol remains in the distilling flask.

EXAMPLE VII

*Preparation of 1-(α-tetrahydrofuryl)-2-methyl-2-ethyl-1,3-dihydroxypropane*

184 g. (1 mole) of 1-(α-furyl)-2-methyl-2-ethyl-1,3-dihydroxypropane is dissolved in 200 ml. of isopropanol. 2 ml. of Raney nickel catalyst are added, and the glycol is hydrogenated at an initial pressure of 100–150 p.s.i. at a reaction temperature of approximately 50° C. After the theoretical amount of hydrogen is consumed, the intake of hydrogen is stopped. The reaction mixture is filtered to remove the catalyst and the solvent is distilled off from a steam bath under vacuum to leave the 1-(α-tetrahydrofuryl) - 2 - methyl - 2 - ethyl - 1,3 - dihydroxypropane in the distilling flask.

EXAMPLE VIII

*Preparation of mono ethyl carbonate of 1-(α-tetrahydrofuryl)-2-methyl-2-ethyl-1,3-dihydroxypropane*

To a solution, cooled to 5–10° C., of 188 g. (1 mole) of 1 - (α - tetrahydrofuryl) - 2 - methyl - 2 - ethyl - 1,3-dihydroxypropane, 100 g. (1½ moles) of pyridine and 200 ml. of benzene is added under agitation over a period of 3 hours, a solution of 108.5 g. (1 mole) of ethylchloroformate in 100 ml. of benzene. Agitation is continued at 5–10° C. for 5 hours and at room temperature for 16 hours. The reaction mixture is washed successively with 100 ml. of cold water, twice with 1% of aqueous hydrochloric acid solution, 100 ml. of a 1% aqueous sodium bicarbonate solution and twice with 100 ml. of water. The organic layer is then dried over sodium sulfate. The solvent is removed by distillation in vacuum, leaving in the distillation flask the mono ethyl carbonate of 1-(α-tetrahydrofuryl) - 2 - methyl - 2 - ethyl - 1,3 - dihydroxypropane which has the following formula:

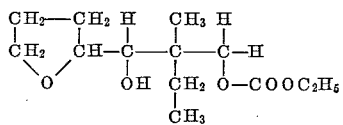

EXAMPLE IX

*Preparation of mono phenyl carbonate of 1-(α-tetrahydrofuryl)-2-methyl-2-ethyl-1,3-dihydroxypropane*

To a solution, cooled to 5–10° C., of 188 g. (1 mole) of 1 - (α - tetrahydrofuryl)-2-methyl-2-ethyl-1,3-dihydroxypropane, 118 g. (1½ moles) of pyridine and 200 ml. of benzene is added under agitation over a period of 3 hours, a solution of 156 g. (1 mole) of phenyl chloroformate in 100 ml. of benzene. Agitation is continued at 5–10° C. for 5 hours and at room temperature for 16 hours. The reaction mixture is washed successively with 100 ml. of cold water, twice with 100 ml. of 1% aqueous hydrochloric acid solution, 100 ml. of a 1% aqueous sodium bicarbonate solution and twice with 100 ml. of water. The organic layer is dried over sodium sulfate. The solvent is removed by distillation in vacuum, leaving in the distilling flask the mono phenyl carbonate of 1-(α-tetrahydrofuryl) - 2-methyl-2-ethyl-1,3-dihydroxypropane which has the formula:

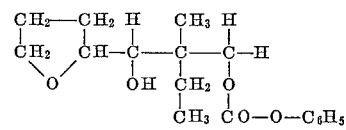

EXAMPLE X

*Preparation of mono phenyl carbamate of 1-(α-furyl)-2-methyl-2-ethyl-1,3-dihydroxypropane*

To a solution cooled in an ice water bath to 5–10° C. of 184 g. (1 mole) of 1-(α-furyl)-2-methyl-2-ethyl-1,3-dihydroxypropane, 460 ml. of tetrahydrofuran and 0.5 ml. of pyridine is added in one portion 119 g. (1 mole) of phenyl isocyanate. The reaction mixture is permitted to stand at 5–10° C. for 2 hours and then at room temperature for 22 hours. Approximately 300 ml. of tetrahydrofuran are distilled off from a steam bath. To the remainder is added 500 ml. of toluene and the rest of the tetrahydrofuran (approximately 160 ml.) and 100 ml. of toluene are distilled off in a slight vacuum. The mono phenyl carbamate crystallizes out of the toluene solution on cooling. It is collected on a Büchner funnel, washed with 50 ml. of cold toluene and dried to remove any traces of the solvent. It has the formula:

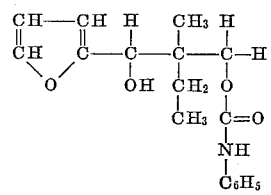

EXAMPLE XI

*Preparation of 1-(α-furyl)-2-methyl-2-propyl-1,3-dihydroxypropane*

To a solution maintained at a temperature between 10–15° C. of 44 g. (1.1 mole) of sodium hydroxide in 660 ml. of methanol is added over a period of 6 hours, under agitation, a solution of 96 g. (1 mole) of freshly distilled furfural, 220 g. (2.2 moles) of methyl propyl acetaldehyde and 50 ml. of methanol. Agitation is continued overnight at room temperature (approximately 16 hours). The next day the reaction mixture is neutralized with acetic acid. 300 ml. of water are added to the reaction mixture and approximately 700 ml. of methanol are distilled off under agitation. The residue is taken up to 200 ml. of benzene and the resulting solution is washed successively with 100 ml. of water, twice with 100 ml. of aqueous sodium bicarbonate solution and finally with 100 ml. portions of water, until neutral to litmus. The solvent is removed by distillation in a vacuum. Any unreacted material is removed by distillation in vacuum. The 1-(α-furyl)-2-methyl-2-propyl-1,3-dihydroxypropane remains in the distilling flask.

EXAMPLE XII

*Preparation of 1-(α-tetrahydrofuryl)-2-methyl-2-propyl-1,3-dihydroxypropane*

198 g. (1 mole) of 1-(α-furyl)-2-methyl-2-propyl-1,3-dihydroxypropane is dissolved in 200 ml. of isopropanol. 2 ml. of Raney nickel catalyst are added and the glycol is hydrogenated at an initial pressure of 100–150 p.s.i. at a reaction temperature of approximately 50° C. After the theoretical amount of hydrogen is taken up, addition of hydrogen is terminated. The reaction mixture is liberated from the catalyst by filtration. The solvent is distilled off under vacuum, leaving the desired 1-(α-tetrahydrofuryl) - 2-methyl-2-propyl-1,3-dihydroxypropane in the distilling flask.

EXAMPLE XIII

*Preparation of cyclic carbonate of 1-(α-tetrahydrofuryl)-2-methyl-2propyl-1,3-dihydroxypropane*

Into a solution maintained at 0–5° C. of 202 g. (1 mole) of 1-(α-tetrahydrofuryl)-2-methyl-2-propyl-1,3-dihydroxypropane and 600 ml. of toluene is added under agitation during 3–4 hours a stream of 1.5 moles of phosgene. Agitation is continued at this temperature for 2 hours. The reaction mixture is brought to room temperature under agitation and is eventually heated to 30–35° C. for 1 hour. Excess phosgene evaporates, leaving the cyclic carbonate in the toluene solution. Removing the toluene in vacuum liberates the cyclic carbonate of 1-(α-tetrahydrofuryl) - 2 - methyl-2-propyl-1,3-dihydroxypropane which has the following formula:

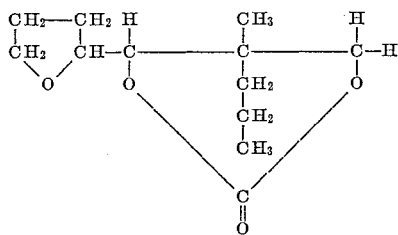

EXAMPLE XIV

*Preparation of mono carbamate of 1-(α-tetrahydrofuryl)-2-methyl-2-propyl-1,3-dihydroxypropane*

Over a period of 14 hours, a stream of ammonia gas is passed through an agitated mixture of 228 g. (1 mole) of cyclic carbonate of 1-(α-tetrahydrofuryl)-2-methyl-2-propyl-1,3-dihydroxypropane, 100 ml. of ammonia water and 200 ml. of isopropanol. The gas introduction is then terminated and the reaction mixture is heated under agitation to approximately 40° C. Under these conditions, the excess unreacted ammonia gas evaporates. The mixture is cooled and 300–400 ml. of cold water is added. The mixture is extracted twice with 200 ml. of toluene. The toluene extract is refluxed with a water-trap to remove any water present, cooled and refluxed again for 10 minutes with 5 g. of activated carbon. The hot solution is filtered. The mono carbamate mixture, consisting mostly of the Formula I isomer, crystallizes on cooling. It is collected on a Buchner funnel and washed with 50 ml. of cold toluene. The solvent consisting of traces of toluene is evaporated from the mono carbamate. The two carbamates formed have the following formulas:

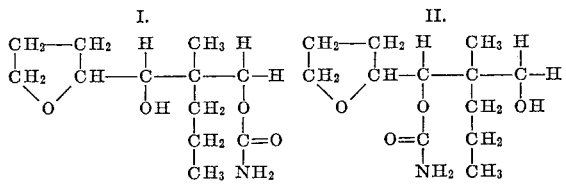

EXAMPLE XV

*Preparation of mono methyl carbamate of 1-(α-tetrahydrofuryl)-2-methyl-2-propyl-1,3-dihydroxypropane*

A solution of 202 g. (1 mole) of 1-(α-tetrahydrofuryl)-2-methyl-2-propyl-1,3-dihydroxypropane, 505 ml. of tetrahydrofuran and 0.5 ml. of pyridine is cooled in an ice water bath to 5–10° C. To this solution is added in one portion 57 g. (1 mole) of methylisocyanate. The resulting reaction mixture is permitted to stand at 5–10° C. for 2 hours and at room temperature for 22 hours. Approximately 300 ml. of tetrahydrofuran are removed by distillation from a steam bath. To the remaining reaction mixture is added 500 ml. of toluene, and the remaining tetrahydrofuran and 100 ml. of toluene are distilled off in a slight vacuum. The mono methyl carbamate crystallizes out of the toluene solution on cooling. It is collected on a Büchner funnel, washed with 50 ml. of dry cold toluene and dried to remove any traces of the solvent. The mono methyl carbamate of 1-(α-tetrahydrofuryl)-2-methyl-2-propyl-1,3-dihydroxypropane has the following formula:

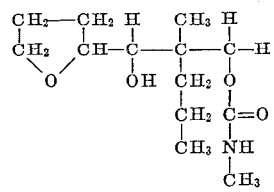

EXAMPLE XVI

*Preparation of dimethyl carbamate of 1-(α-tetrahydrofuryl)-2-methyl-2-propyl-1,3-dihydroxypropane*

A solution of 202 g. (1 mole) of 1-(α-tetrahydrofuryl)-2-methyl-2-propyl-1,3-dihydroxypropane, 505 ml. of tetrahydrofuran, and 0.5 ml. of pyridine is cooled in an ice water bath to 5–10° C. To this solution is added in one portion 120 g. (2.1 moles) of methyl isocyanate. The reaction mixture is permitted to stand at 5–10° C. for 2 hours and then at room temperature for 22 hours. Approximately 300 ml. of tetrahydrofuran are removed by distillation from a steam bath. To the remainder is added 500 ml. of toluene and the rest of the tetrahydrofuran (approximately 205 ml.) and 100 ml. of toluene are distilled off in a slight vacuum. The dimethyl carbamate crystallizes out of the toluene solution on cooling. It is collected on a Buchner funnel, washed with 50 ml. of cold toluene and dried to remove any traces of the solvent.

EXAMPLE XVII

*Preparation of 1-(α-furyl)-2,2-diethyl-1, 3-dihydroxypropane*

To a solution of 44 g. (1.1 moles) of sodium hydroxide in 660 ml. of methanol is added over a period of 6 hours, under agitation, a solution of 96 g. (1 mole) of freshly distilled furfural, 205 g. (2.05 moles) of diethyl acetaldehyde and 50 ml. methanol. During the reaction, the temperature is maintained between 10–15° C. Agitation is continued overnight at room temperature (approximately 16 hours). The next day, the reaction mixture is neutralized with acetic acid and 300 ml. of water are added. Approximately 700 ml. of methanol are distilled off under agitation. The residue is taken up in 200 ml. benzene and the resulting solution is washed successively with 100 ml. of warm water, twice with 100 ml. of aqueous sodium bicarbonate solution and finally 100 ml. portions of water until neutral to litmus. The solvent is removed by distillation in a vacuum. Any unreacted material is removed by distillation in vacuum. 1-(α-furyl)-2,2-diethyl-1,3-dihydroxypropane remains in the distilling flask.

EXAMPLE XVIII

*Preparation of 1-(α-tetrahydrofuryl)-2,2-diethyl-1, 3-dihydroxypropane*

198 g. (1 mole) of 1-(α-furyl)-2,2-diethyl-1,3-dihydroxypropane is dissolved in 200 ml. of isopropanol. 2 ml. of Raney nickel catalyst are added and the unsaturated glycol is hydrogenated at an initial pressure of 100–150 p.s.i. and at a reaction temperature of approximately 50° C. After the theoretical amount of hydrogen is taken up, addition of hydrogen is stopped. The reaction mixture is filtered to remove the catalyst and the solvent is distilled off from a steam bath under vacuum, leaving the 1-(α-tetrahydrofuryl)-2,2-diethyl-1,3 - dihydroxypropane in the distilling flask.

EXAMPLE XIX

*Preparation of mono methyl carbonate of 1-(α-furyl)-2,2-diethyl-1,3-dihydroxypropane*

To a solution of 198 g. (1 mole) of 1-(α-furyl)-2,2-diethyl-1,3-dihydroxypane, 118 g. (1½ moles) of pyridine and 200 ml. of benzene, maintained at 5–10° C., is added under agitation over a period of 3 hours a solution of 94 g. (1 mole) of methyl chloroformate in 50 ml. of benzene. Agitation is continued at 5–10° C. for 5 hours, and at room temperature for 16 hours. To the reaction mixture is added 100 ml. of cold water. After agitation for 10 minutes, the water part is separated from the organic layer. The organic layer is then washed successively twice with 100 ml. of 1% hydrochloric acid solution, 100 ml. of 1% sodium bicarbonate solution, and twice with 100 ml. of water. The organic layer is then dried over sodium sulfate. The solvent is removed by distillation in vacuum. The mono methyl carbonate of 1-(α-furyl)-2,2-diethyl-1,3-dihydroxypropane which is left in the distilling flask has the following formula:

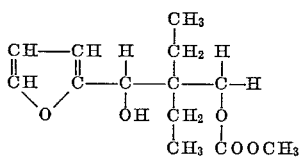

EXAMPLE XX

*Preparation of mono phenyl carbonate of 1-(α-furyl)-2,2-dimethyl-1,3-dihydroxypropane*

To solution of 198 g. of 1-(α-furyl)-2,2-diethyl-1,3, dihydroxypropane, 118 g. (1½ moles) of pyridine and 200 ml. of benzene maintained at 5–10° C., is added under agitation over a period of 3 hours, a solution of 156 g. (1 mole) of phenyl chloroformate in 100 ml. of benzene. Agitation is continued at 5–10° C. for 5 hours, and at room temperature for 16 hours. The reaction mixture is washed successively with 100 ml. of cold water, twice with 100 ml. of 1% aqueous hydrochloric acid solution, 100 ml. of aqueous 1% sodium bicarbonate solution and twice with 100 ml. of water. The solution is then dried over sodium sulfate. The benzene is removed by distillation in vacuum, leaving the mono phenyl carbonate in the distilling flask. The mono phenyl carbonate of 1-(α-furyl)-2,2-diethyl-1,3-dihydroxypropane has the following formula:

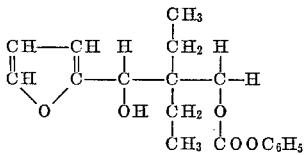

EXAMPLE XXI

*Preparation of diphenyl carbamate of 1-(α-tetrahydrofuryl)-2,2-diethyl-1,3-dihydroxypropane*

To a solution of 202 g. (1 mole) of 1-(α-tetrahydrofuryl)-2,2-diethyl-1,3-dihydroxypropane, 495 ml. of tetrahydrofuran and 0.5 ml. of pyridine, cooled in an ice water bath to 5–10° C. is added in one portion, 250 g. (2.1 moles) of phenyl isocyanate. The reaction mixture is permitted to stand at 5–10° C. for 2 hours and then at room temperature for 24 hours. Approximately 300 ml. of tetrahydrofuran are distilled off from a steam bath. To the remainder is added 500 ml. of toluene and the rest of the tetrahydrofuran (approximately 195 ml.) and 100 ml. of toluene are distilled off in a slight vacuum. The diphenyl carbamate crystallizes out of the toluene solution on cooling. It is collected on a Buchner funnel and washed with 50 ml. of cold toluene. Traces of the solvent are evaporated from the desired diphenyl carbamate of 1-(α-tetrahydrofuryl)-2,2-diethyl-1,3-dihydroxypropane.

EXAMPLE XXII

*Preparation of 1-(α-furyl)-2-ethyl-2-butyl-1,3-dihydroxypropane*

To a solution of 44 g. (1.1 moles) of sodium hydroxide in 660 ml. of methanol, is added over a period of 6 hours under agitation at a temperature between 10–15° C., a solution of 96 g. (1 mole) of freshly distilled furfural, 282 g. (2.2 moles) of ethyl butyl acetaldehyde and 50 ml. of methanol. Agitation is continued overnight at room temperature, approximately 16 hours. The next day the reaction mixture is neutralized with acetic acid. 300 ml. of water are added to the reaction mixture and approximately 700 ml. of methanol are distilled off under agitation. The residue is taken up in 200 ml. of benzene and the resulting solution is washed successively with 100 ml. of water, twice with 100 ml. of aqueous sodium bicarbonate solution and with 100 ml. portions of water until neutral to litmus. The solvent is distilled off in vacuum. Any unreacted material is removed by distillation in vacuum. The 1-(α-furyl)-2-ethyl-2-butyl-1,3-dihydroxypropane remains in the distilling flask.

EXAMPLE XXIII

*Preparation of 1-(α-tetrahydrofuryl)-2-ethyl-2-butyl-1,3-dihydroxypropane*

226 g. (1 mole) of 1- (α-furyl)-2-ethyl-2-butyl-1,3-dihydroxypropane is dissolved in 200 ml. of isopropanol. 2 ml. of Raney nickel catalyst are added and the unsaturated glycol is hydrogenated at an initial pressure of 100–150 p.s.i. at a reaction temperature of approximately 50° C. After the theoretical amount of hydrogen is taken up, addition of hydrogen is terminated. The reaction mixture is liberated from the catalyst by filtration. The solvent is distilled off in a vacuum, leaving the desired 1 - (α-tetrahydrofuryl)-2-ethyl-2-butyl-1,3-dihydroxypropane in the distilling flask.

EXAMPLE XXIV

*Preparation of mono methyl carbamate of 1-(α-furyl)-2-ethyl-2-butyl-1,3-dihydroxypropane*

A solution of 226 g. (1 mole) of 1-(α-furyl)-2-ethyl-2-butyl-1,3-dihydroxypropane, 565 ml. of tetrahydrofuran and 0.5 ml. of pyridine is cooled in an ice water bath to 5–10° C. To this solution is added in one portion 57 g. (1 mole) of methyl isocyanate. The reaction mixture is permitted to stand at 5–10° C. for 2 hours and then at room temperature for 22 hours. Approximately 400 ml. of tetrahydrofuran are removed by distillation from a steam bath. To the remainder is added 500 ml. of toluene, and the rest of the tetrahydrofuran (approximately 165 ml.) and 100 ml. of toluene are distilled off in a slight vacuum. The mono methyl carbamate crystallizes out of the toluene solution on cooling. It is collected on a Büchner funnel, washed with 50 ml. of cold toluene and dried to remove any traces of the solvent. It has the following formula:

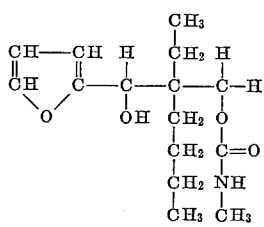

EXAMPLE XXV

*Preparation of dimethyl carbamate of 1-(α-furyl)-2-ethyl-2-butyl-1,3-dihydroxypropane*

To a solution of 226 g. (1 mole) of 1-(α-furyl)-2-ethyl-2-butyl-1,3-dihydroxypropane, 565 ml. of tetrahydrofuran and 0.5 ml. of pyridine is cooled in an ice water bath to 5–10° C. To this solution is added in one portion 120 g. (2.1 moles) of methyl isocyanate. The reaction mixture is permitted to stand at 5–10° C. for 2 hours and then at room temperature for 22 hours. Approximately 400 ml. of tetrahydrofuran are removed by distillation from a steam bath. To the remainder is added 500 ml. of toluene and the rest of the tetrahydrofuran (approximately 165 ml.) and 100 ml. toluene are distilled off in a slight vacuum. The dimethyl carbamate of 1-(α-furyl)-2-ethyl-2-butyl-1,3-dihydroxypropane crystallizes out of the toluene solution on cooling. It is collected on a Büchner funnel, washed with 50 ml. of cold toluene and dried to remove any traces of the solvent.

What is claimed is:

1. A compound selected from the class consisting of 1-(α-tetrahydrofuryl)-2,2-di lower alkyl-1,3-dihydroxypropanes, the mono and di lower alkyl carbonates, the mono and di phenyl carbonates, the mono and di lower alkyl carbamates and the mono and di phenyl carbamates of 1-(α-furyl)-2,2-di lower alkyl-1,3-dihydroxypropanes, and the mono and di lower alkyl carbonates, the mono and di phenyl carbonates, the cyclic carbonates, the mono and di carbamates, the mono and di lower alkyl carbamates and the mono and di phenyl carbamates of 1-(α-tetrahydrofuryl)-2,2-di lower alkyl-1,3-dihydroxypropanes, said 1-(α-furyl)-2,2-di lower alkyl-1,3-dihydroxypropanes being of the formula:

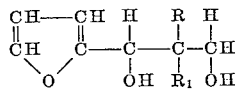

in which R is a lower alkyl group and $R_1$ is a lower alkyl group; and said 1-(α-tetrahydrofuryl)-2,2-di lower alkyl-1,3-dihydroxypropanes being of the furmula:

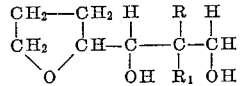

in which R is a lower alkyl group and $R_1$ is a lower alkyl group, the total number of carbon atoms of R and $R_1$ being less than eight.

2. Lower alkyl carbonate of a 1-(α-furyl)-2,2-dialkyl-1,3-dihydroxypropane of the formula:

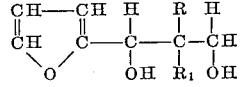

in which R is a lower alkyl group and $R_1$ is a lower alkyl group, the total number of carbon atoms of R and $R_1$ being less than eight.

3. Phenyl carbonate of a 1-(α-furyl)-2,2-dialkyl-1, 3-dihydroxypropane of the formula:

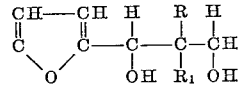

in which R is a lower alkyl group and $R_1$ is a lower alkyl group, the total number of carbon atoms of R and $R_1$ being less than eight.

4. Lower alkyl carbamate of a 1-(α-furyl)-2,2-dialkyl-1,3-dihydroxypropane of the formula:

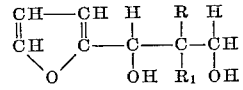

in which R is a lower alkyl group and $R_1$ is a lower alkyl group, the total number of carbon atoms of R and $R_1$ being less than eight.

5. Phenyl carbamate of a 1-(α-furyl)-2,2-dialkyl-1,3-dihydroxypropane of the formula:

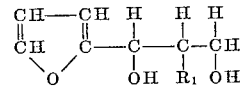

in which R is a lower alkyl group and $R_1$ is a lower alkyl group, the total number of carbon atoms of R and $R_1$ being less than eight.

6. 1-(α-tetrahydrofuryl)-2,2-dialkyl-1,3-dihydroxypropane of the formula:

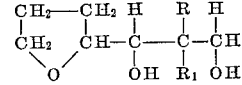

in which R is a lower alkyl group and $R_1$ is a lower alkyl group, the total number of carbon atoms of R and $R_1$ being less than eight.

7. Mono lower alkyl carbonate of a 1-(α-tetrahydrofuryl)-2,2-dialkyl-1,3-dihydroxypropane of the formula:

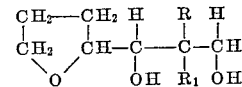

in which R is a lower alkyl group and $R_1$ is a lower alkyl group, the total number of carbon atoms of R and $R_1$ being less than eight.

8. Phenyl carbonate of a 1-(α-tetrahydrofuryl)-2,2-dialkyl-1,3-dihydroxypropane of the formula:

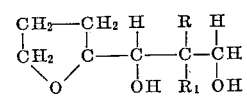

in which R is a lower alkyl group and $R_1$ is a lower alkyl group, the total number of carbon atoms of R and $R_1$ being less than eight.

9. Cyclic carbonate of 1-(α-tetrahydrofuryl)-2,2-dialkyl-1,3-dihydroxypropane of the formula:

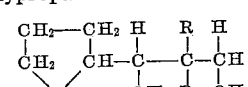

in which R is a lower alkyl group and $R_1$ is a lower alkyl group, the total number of carbon atoms of R and $R_1$ being less than eight.

10. Lower alkyl carbamate of a 1-(α-tetrahydrofuryl)-2,2-dialkyl-1,3-dihydroxypropane of the formula:

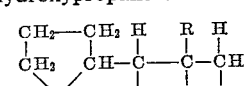

in which R is a lower alkyl group and $R_1$ is a lower alkyl group, the total number of carbon atoms of R and $R_1$ being less than eight.

11. Phenyl carbamate of a 1-(α-tetrahydrofuryl)-2,2-dialkyl-1,3-dihydroxypropane of the formula:

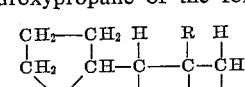

in which R is a lower alkyl group and $R_1$ is a lower alkyl group, the total number of carbon atoms of R and $R_1$ being less than eight.

12. Carbamate of a 1-(α-tetrahydrofuryl)-2,2-dialkyl-1,3-dihydroxypropane of the formula:

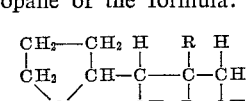

in which R is a lower alkyl group and $R_1$ is a lower alkyl group, the total number of carbon atoms of R and $R_1$ being less than eight.

13. 1-(α-tetrahydrofuryl)-2,2-dimethyl-1,3-dihydroxypropane.

14. Monomethyl carbonate of 1-(α-tetrahydrofuryl)-2,2-dimethyl-1,3-dihydroxypropane.

15. Monocarbamate of 1-(α-tetrahydrofuryl)-2,2-dimethyl-1,3-dihydroxypropane.

16. Monomethyl carbamate of 1-(α-tetrahydrofuryl)-2,2-dimethyl-1,3-dihydroxypropane.

References Cited by the Examiner
UNITED STATES PATENTS 2,537,021  1/1951  Bartlett et al. _____ 260—347.8

NICHOLAS S. RIZZO, *Primary Examiner.*